United States Patent
Cai

(10) Patent No.: US 8,248,993 B2
(45) Date of Patent: Aug. 21, 2012

(54) DISTRIBUTED BASE STATION, COMMUNICATION SYSTEM, AND SIGNAL TRANSMISSION METHOD THEREOF

(75) Inventor: Liyu Cai, Shanghai (CN)

(73) Assignee: Alcatel Lucent, Paris (FR)

( * ) Notice: Subject to any disclaimer, the term of this patent is extended or adjusted under 35 U.S.C. 154(b) by 494 days.

(21) Appl. No.: 11/546,315

(22) Filed: Oct. 12, 2006

(65) Prior Publication Data

US 2007/0093273 A1    Apr. 26, 2007

(30) Foreign Application Priority Data

Oct. 18, 2005   (CN) .......................... 2005 1 0030624

(51) Int. Cl.
*H04W 4/00*   (2009.01)
*H04W 24/00*  (2009.01)
(52) U.S. Cl. ..................... 370/328; 455/456.1
(58) Field of Classification Search ............. 370/328, 370/342, 329, 338; 455/82, 456.1–456.6; 375/260, 267
See application file for complete search history.

(56) References Cited

U.S. PATENT DOCUMENTS

| | | | |
|---|---|---|---|
| 2002/0085643 A1* | 7/2002 | Kitchener et al. | 375/267 |
| 2003/0235147 A1 | 12/2003 | Walton et al. | |
| 2004/0127168 A1* | 7/2004 | Ito | 455/82 |
| 2004/0137906 A1 | 7/2004 | Nakao et al. | |
| 2005/0111424 A1* | 5/2005 | Tsai et al. | 370/342 |
| 2005/0113120 A1* | 5/2005 | Rappaport et al. | 455/500 |
| 2006/0120477 A1* | 6/2006 | Shen et al. | 375/267 |
| 2006/0155534 A1* | 7/2006 | Lin et al. | 704/223 |

FOREIGN PATENT DOCUMENTS

CN    1512699 A    7/2004

OTHER PUBLICATIONS

Chen Hao-min, et al.;Transmit and receive weights optimization algorithm in MIMO-SDMA system; Personal, Indoor and Mobile Radio Communications, 2003. PIMRC 2003. 14$^{th}$ IEEE Proceedings on, vol. 3, Sep. 7-10, 2003 pp. 2868-2871 vol. 3.
Bourdoux, A. Khaled, N.; Joint TX-RX optimization for MIMO-SDMA based on a -space constraint; Vehicular Technology Conference, 2002. Proceedings. VTC 2002-Fall. 2002 IEEE 56$^{th}$. vol. I, Sep. 24-28, 2002 pp. 171-174 vol. 1.

(Continued)

*Primary Examiner* — Michael Faragalla
(74) *Attorney, Agent, or Firm* — Fay Sharpe LLP

(57) ABSTRACT

The present invention discloses a distributed base station serving mobile stations, which comprises multiple antenna-RF processing units and a central processing unit remotely connected with said multiple antenna-RF processing units. Each of the antenna-RF processing units has an antenna array formed by multiple antennas. Said central processing unit comprises: an MIMO coding unit for MIMO coding of data of each of the mobile stations so that data of each of the mobile stations generates multi-path data symbols; a beam-forming unit for multiplying each path data symbol of the multi-path data symbols of each of the mobile stations by a weighted coefficient vector corresponding to this path data symbol, to obtain beam-forming data of each path data symbol of each of the mobile stations; and an overlapping unit for, with respect to each antenna in said antenna-RF processing units, overlapping beam-forming data of the respective mobile stations for this antenna and feeding the overlapped beam-forming data to this antenna for transmission. The present invention further discloses a communication system having the above distributed base station and the corresponding signal transmission method.

18 Claims, 2 Drawing Sheets

OTHER PUBLICATIONS

Nishimura, T., et al.; Transmit forming for a MIMO/SDMA downlink with receive antenna selection; Vehicular Technology Conference, 2002. Proceedings. VTC 2002-Fall. 2002 IEEE 56th, vol. I, Sep. 24-28, 2002 pp. 190-194 vol. 1.

Wolniansky P. W., et al.: "V-BLAST: An Architecture for Realizing Very High Data Rates Over the Rich-Scattering Wireless Channel," Signals, Systems, and Electronics, 1998, ISSSE 98, 1998 URSI International Symposium on Pisa, Italy, Sep. 29-Oct. 2, 1998, New York, NY USA, IEEE, US Sep. 29, 1998, pp. 295-300, XP010316748.

* cited by examiner

DISTRIBUTED BASE STATION, COMMUNICATION SYSTEM, AND SIGNAL TRANSMISSION METHOD THEREOF

CROSS-REFERENCE TO RELATED APPLICATIONS

This application is entitled to the benefit of Chinese Patent Application No. CN200510030624.9 filed on Oct. 18, 2005 with the Chinese Patent Office.

FIELD OF THE INVENTION

The present invention relates to Multiple Input Multiple Output (MIMO) transmission, and particularly to a distributed-structured base station that performs transmission using Multiple Input Multiple Output (MIMO) channels, a communication system having the base station, and a signal transmission method used in the aforesaid base station and communication system.

BACKGROUND OF THE INVENTION

The development of mobile communication services imposes higher requirements on the transmission capability of air interfaces of future wireless communication systems. Thus, how to design systems with high peak transmission rate and high capacity has become a huge challenge.

In order to utilize limited radio frequency resources more effectively, the Time Division Multiple Access (TDMA) technique, the Frequency Division Multiple Access (FDMA) technique and the Code Division Multiple Access (CDMA) technique have been widely applied in mobile communication. Based thereon, two major mobile communication networks, namely GSM and CDMA, have been set up. These three existing techniques have been put into ample applications in terms of technique, and the spectrum utilization ratio has risen to the maximum.

However, as spectrum resources get increasing limited, future mobile communication systems might resort to a higher frequency band, such as the frequency band of 5 GHz. A higher frequency band means more serious channel fade than the 2 GHz frequency band of 3G systems, and a high transmission rate demands a higher signal/noise ratio and better channel transmission conditions. Therefore, the coverage of a base station of a future mobile communication system must be far less than that of a base station of current 2G and 3G systems. According to relevant study results, typically a future base station has a radius of several hundred meters or less. Therefore, whether or not conventional cellular network structures can be adopted and new architectures can be designed in future systems so as to meet future systems' demands becomes a problem that is worthy of careful consideration.

The MIMO technology proposed on this premise further improves the channel capacity by using multiple transmitting antennas and multiple receiving antennas. When there are ideal channel parameters (which may be obtained through channel estimation using training sequence or pilot sequence) on the receiving end, information capacity of the system with multiple transmitting antennas and multiple receiving antennas is in direct ratio to the smaller value between the number of transmitting antennas and the number of receiving antennas. In case of Rayleigh slow fading channel, the MIMO technology applies a model of multi-element antenna elements and spatial and time diversity at both ends of a wireless link, so that the system capacity is greatly enhanced and the wireless link reliability is improved at the same time.

As is well known, the MIMO technology is suitable for wireless transmission environment with rich scattering and relatively independent spatial correlation between antennas. If the channel environment has relatively strong spatial correlation, such as in conditions of line-of-sight propagation, the MIMO performance will decrease on a big scale. This is a major problem restricting MIMO applications.

As discussed previously, considering that the coverage radius of a base station will become smaller and smaller, a distributed structure can be introduced in order to improve the system coverage. FIG. 1 shows a schematic view of the existing distributed structure. As shown in FIG. 1, three antenna-RF processing units AP1, AP2 and AP3 serve as three access points located at three positions closer to mobile stations MT1, MT2 and MT3, respectively, and a baseband processing unit 10 serves as a central processing unit which is a centralized processing apparatus. The baseband processing unit 10 can be connected with the multiple antenna-RF processing units AP1, AP2 and AP3 in transmission forms such as radio over fiber (RoF) or copper wire, to perform data modulation and demodulation on these antennas.

Different from one-to-one form in a cellular system, antenna-RF processing units and a baseband processing unit is in multiple-to-one connection and control form in a distributed structure. In the distributed structure as shown in FIG. 1, each of the antenna-RF processing units is provided with four antennas, and each of the mobile stations is provided with two antennas. Through measurement of spatial correlation, two antennas can be selected from different antenna-RF processing units to form 2×2 MIMO transmission. For example, the respective first antennas selected from the antenna-RF processing units AP1 and AP3 form 2×2 MIMO transmission with the mobile station MT2, while other antennas are closed to avoid interference. Since the antenna-RF processing units AP1 and AP3 are widely spaced from each other, and correlation between the selected antennas is very weak, MIMO channels constituted by multiple pairs of distributed-placed remote antenna-RF processing units can well meet conditions for spatial independence.

In case of multiple mobile stations, the above distributed structure using MIMO channels mainly utilizes time division or frequency division to meet transmission for multiple mobile stations. That is to say, in different slots or frequencies, antennas to be used are selected in accordance with spatial correlation, and the system serves different mobile stations, and other antennas are closed to avoid interference. In other words, only one mobile station will be served in each slot or frequency. This severely restricts the system capacity.

With technological development, some technologies capable of effectively improving the system capacity have been proposed in recent years, such as beam forming and space division multiple access (SDMA). The beam-forming technology, which is applied to base stations of mobile communication, utilizes antenna arrays to gather signal energy into a very narrow beam and converges transmission power in the mobile station direction to obtain link gain, and thus improves the antenna propagation efficiency, wireless link reliability and frequency multiplexing rate. The SDMA technology can increase the output of downlink link cells by simultaneously scheduling packets for mobile stations that utilize different beam service, and thus makes it possible for mobile users who are merely different in spatial locations to multiplex one identical traditional physical channel. In consequence, in a system using the SDMA technology, multiple mobile stations can use the same wireless channel resources at the same time, such as slot, frequency and code, and the mobile stations are separated through spatial filtering. In this regard, Japan has already set about SDMA test and commercial use on PHYS systems.

SUMMARY OF THE INVENTION

In view of the problem that the system capacity in a distributed structure using MIMO channel is restricted, the present invention proposes a distributed base station by making reference to the above technologies for improving the system capacity. The base station simultaneously occupies the same wireless channel resources and communicates with multiple adjacent mobile stations with one or more distributed antenna-RF processing unit of the base station. In order to avoid multiple access interference between the mobile stations, the mobile stations are spaced through beam-forming processing. Several beams pointing to the mobile station and multiple antennas on the mobile station further constitute MIMO transmission to raise transmission rate of the mobile station.

In the distributed base station according to the present invention, there are comprised multiple antenna-RF processing units and a central processing unit remotely connected with said multiple antenna-RF processing units. Each of the antenna-RF processing units has an antenna array formed by multiple antennas. Said central processing unit comprises: an MIMO coding unit for MIMO coding of data of each of the mobile stations so that data of each of the mobile stations generates multi-path data symbols; a beam-forming unit for multiplying each path data symbol of the multi-path data symbols of each of the mobile stations by a weighted coefficient vector corresponding to this path data symbol, to obtain beam-forming data of each path data symbol of each of the mobile stations; and an overlapping unit for, with respect to each antenna in said antenna-RF processing units, overlapping beam-forming data of the respective mobile stations for this antenna and feeding the overlapped beam-forming data to this antenna for transmission.

The present invention further provides a communication system having the above distributed base station. Due to the use of the above distributed base station, beams which the base station directionally transmits to each of the mobile stations via its antennas constitute an MIMO transmission system together with antennas of the corresponding mobile station.

A signal transmission method used in the above distributed base station and communication system comprises the following steps: an MIMO coding step for MIMO coding of data of said base station for each of the mobile stations to divide data of each of the mobile stations into multi-path data symbols; a beam-forming data obtaining step for multiplying each path data symbol of the multi-path data symbols of each of the mobile stations by a weighted coefficient vector corresponding to this path data symbol to obtain beam-forming data of each path data symbol of each of the mobile stations; and an overlapping step for, with respect to each antenna in said antenna-RF processing unit, overlapping beam-forming data of the respective mobile stations for this antenna and feeding the overlapped beam-forming data to this antenna for transmission.

Due to the adoption of SDMA multiple access mode that multiple remote antenna-RF processing units perform joint processing, the distributed base station, communication system and signal transmission method of the present invention can effectively reduce interference between mobile stations, so that it becomes possible for multiple mobile stations to simultaneously perform transmission using the same channel resources, and the overall system capacity is raised.

Other characteristics and advantages of the present invention will become more apparent upon reading of the detailed description of embodiments thereof when taken in conjunction with the accompanying drawings.

DETAILED DESCRIPTION OF PREFERRED EMBODIMENTS

Referring to the accompanying drawings, embodiments of the present invention will be described in detail.

Figure 1:
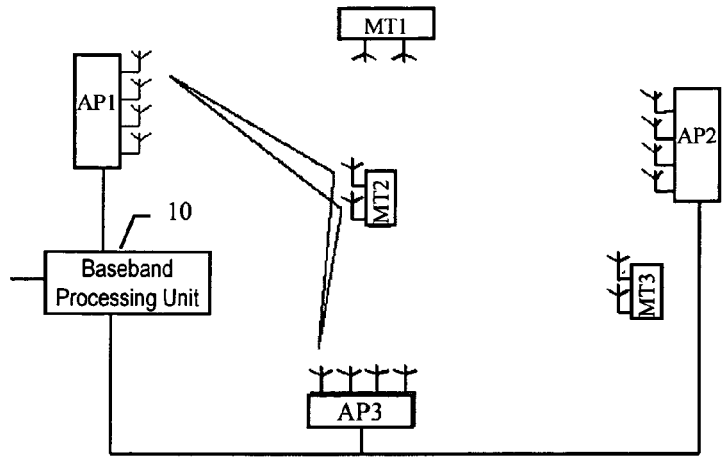
FIG. 1 shows a schematic layout view of the existing distributed communication system.
Figure 2:
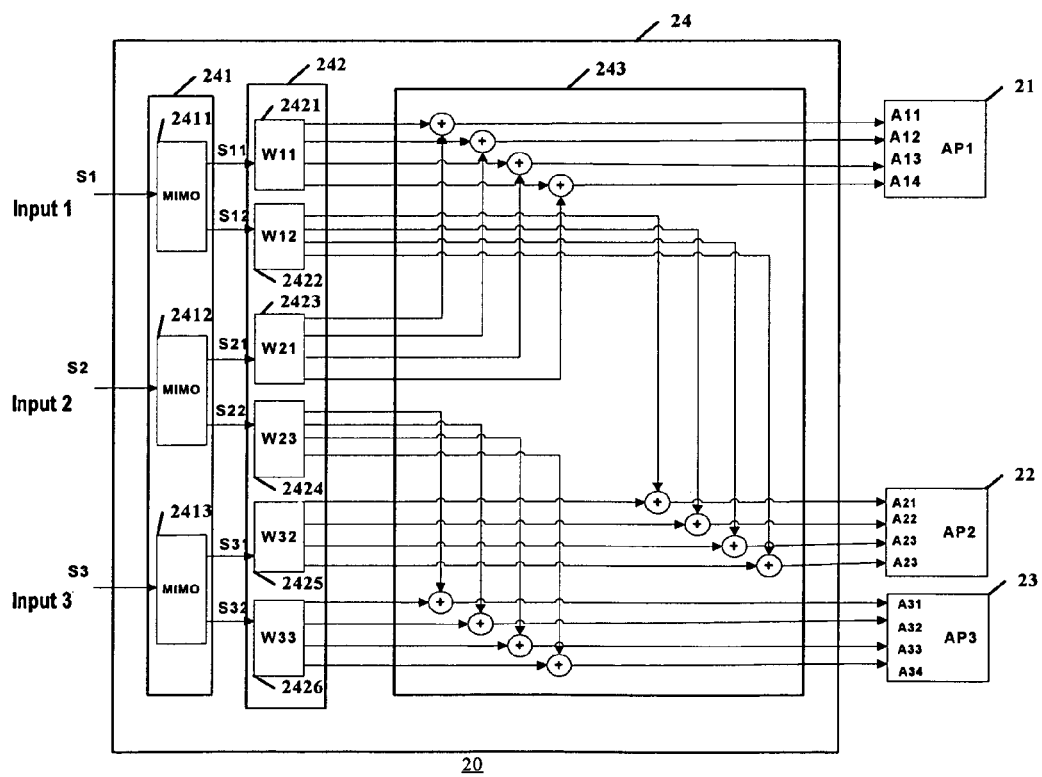
FIG. 2 shows a schematic layout view of a distributed base station according to the present invention.
Figure 3:
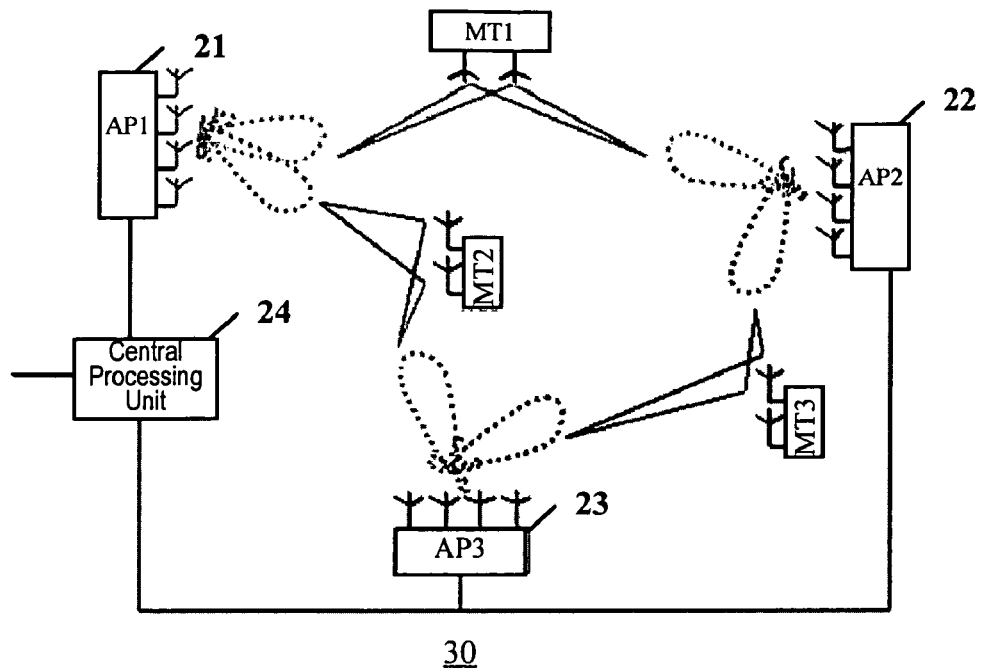
FIG. 3 shows a schematic layout view of a distributed communication system according to the present invention.

FIG. 2 shows a schematic layout view of a distributed base station according to the present invention. For the purpose of convenience, the embodiment of the present invention is explained by taking the following situation as an example: a distributed base station 20 adopts three remote antenna-RF processing units 21, 22 and 23 each of which is provided with four antennas. Referring to FIG. 3, service is simultaneously provided to three mobile stations MT1, MT2 and MT3 each of which is provided with two antennas, by using the distributed base station 20 as shown in FIG. 2. Here, the system adopts a 2×2 MIMO solution, in which the antenna-RF processing units 21 and 22 are selected to form two beams which form MIMO in conjunction with MT1, and the antenna-RF processing units 22 and 23 are selected to form two beams which form MIMO in conjunction with MT3.

As shown in FIG. 2, the distributed base station according to the present invention further comprises a central processing unit 24 which is connected with the three antenna-RF processing units 21, 22 and 23 in transmission forms like RoF or copper wire. The central processing unit 24 comprises an MIMO coding unit 241, a beam-forming unit 242 and an overlapping unit 243.

During operation of the distributed base station 20, data S1 of the mobile station MT1 is coded by an MIMO coding unit 2411 to generate two path data symbols S11 and S12. Processing of the MIMO coding unit can take any one of Space Time Block Code (STBC), Space Frequency Block Code (SFBC) and Spatial Reuse (V-BLAST). The two path data symbols S11 and S12 are respectively fed to beam-forming units 2421 and 2422 corresponding to the mobile station MT1. These two beam-forming units correspond to the antenna-RF processing units 21 and 22, respectively, which are selected by the mobile station MT1 to form beams. In the beam-forming unit 2421, the input data symbol S11 is multiplied by a weighted vector W12 of the beam-forming unit 2421, to obtain beam-forming data of the data symbol S11 with respect to the four antennas of the antenna-RF processing unit 21. The weighted vector W11 denotes weighted coefficient vectors of the data symbol of the mobile station MT1 on all the antennas (four in the present embodiment) of the antenna-RF processing unit 21. In the beam-forming unit 2422, the input data symbol S12 is multiplied by a weighted vector W12 of the beam-forming unit 2422, to obtain beam-forming data of the data symbol S12 with respect to the four antennas of the antenna-RF processing unit 22. The weighted vector W12 denotes weighted coefficient vectors of the data symbol of the mobile station MT1 on all the antennas (four in the present embodiment) of the antenna-RF processing unit 22. In the present embodiment, the weighted vector of each of the mobile stations on each of the antennas of each of the antenna-RF processing units is calculated using channel measurement and feedback information of the mobile stations and based on a commonly used criterion for reducing interference on other mobile stations or other preferred criterion.

The data processing performed by the distributed base station 20 on the mobile stations MT2 and MT3 is similar to the above data processing on the mobile station MT1. A difference is that since the mobile station MT2 selects the antenna-RF processing units 21 and 23 as two antenna-RF processing units to form beams, two beam-forming units 2423 and 2424 obtain beam-forming data with respect to the four antennas of the antenna-RF processing unit 21 and the four antennas of the antenna-RF processing unit 23, respectively. And the data processing on the mobile station MT3 results in beam-forming data with respect to the four antennas of the antenna-RF processing unit 22 and the four antennas of the antenna-RF processing unit 23, respectively.

Afterwards, with respect to each of the antennas of the antenna-RF processing units 21, 22 and 23, the overlapping unit 243 overlaps the beam-forming data of each of the mobile stations for the antenna, and forms the overlapped beam-forming data into beams which point to the respective mobile stations on all the antennas of the antenna-RF processing units, so as to send to the respective mobile stations the multi-path data symbols corresponding to them.

Receiving of a signal transmitted by the distributed base station of the present invention will be illustrated in the following.

In the present embodiment, two of the antenna-RF processing units are selected to form MIMO transmission in conjunction with one of the mobile stations, and each of the antenna-RF processing units has four antennas. Thus, the MIMO channel is an 8×2 channel, $$H = \begin{bmatrix} h_{11} & h_{12} & \cdots & h_{18} \\ h_{21} & h_{22} & \cdots & h_{28} \end{bmatrix},$$

in which $h_{i,1\ldots4}$ is channel response of the four antennas of the first antenna-RF processing unit selected, and $h_{i,2\ldots8}$ is channel response of the four antennas of the second antenna-RF processing unit selected.

Data received by the mobile station can be expressed as:

$$S = \begin{bmatrix} h_{11} & h_{12} & \cdots & h_{18} \\ h_{21} & h_{22} & \cdots & h_{28} \end{bmatrix} * \begin{bmatrix} w_{11}s_1 \\ w_{12}s_1 \\ w_{13}s_1 \\ w_{14}s_1 \\ w_{21}s_2 \\ w_{22}s_2 \\ w_{23}s_2 \\ w_{24}s_2 \end{bmatrix}$$

-continued $$= \begin{bmatrix} \sum_{i=1}^{4} h_{1i}w_{1i}s_1 + \sum_{i=1}^{4} h_{1(i+4)}w_{2i}s_2 \\ \sum_{i=1}^{4} h_{2i}w_{1i}s_1 + \sum_{i=1}^{4} h_{2(i+4)}w_{2i}s_2 \end{bmatrix}$$

$$= \begin{bmatrix} \sum_{i=1}^{4} h_{1i}w_{1i} & \sum_{i=1}^{4} h_{i(i+4)}w_{2i} \\ \sum_{i=1}^{4} h_{2i}w_{1i} & \sum_{i=1}^{4} h_{2(i+4)}w_{2i} \end{bmatrix} \begin{bmatrix} s_1 \\ s_2 \end{bmatrix}$$

which is equivalent to a 2*2 MIMO channel passing through $$H = \begin{bmatrix} \sum_{i=1}^{4} h_{1i}w_{1i} & \sum_{i=1}^{4} h_{i(i+4)}w_{2i} \\ \sum_{i=1}^{4} h_{2i}w_{1i} & \sum_{i=1}^{4} h_{2(i+4)}w_{2i} \end{bmatrix}.$$

On the mobile station side, weighted vector information set on the transmitter end must be obtained in order to successfully detect the transmitted signal, and it is weighted with actual channel estimates to detect data transmitted by the antenna-RF processing units.

FIG. 3 shows a schematic view of a communication system having the above distributed base station. A communication system 30 as shown in FIG. 3 comprises the distributed base station 20 with the structure as shown in FIG. 2 and the multiple mobile stations MT1, MT2 and MT3 within a coverage area of the base station. The distributed base station 20 comprises the three antenna-RF processing units 21, 22 and 23 and the central processing unit 24.

Seen from the description of FIG. 2, the respective antenna-RF processing units 21, 22 and 23 in the distributed base station 20 transmit directional beams to the mobile stations MT1, MT2 and MT3 using their own multiple antennas, for example, the antenna array formed by four antennas in the present embodiment, and as shown in FIG. 3, two beams pointing to each of the mobile stations and two antennas on the mobile station further form 2×2 MIMO transmission to thereby enhance the transmission rate.

Figure 4:
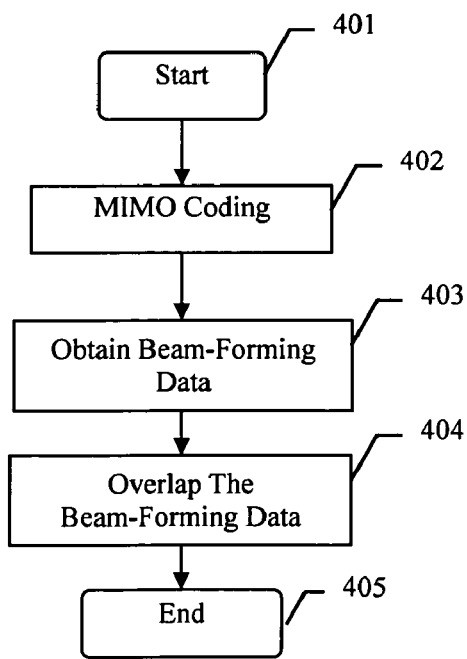
FIG. 4 shows a flowchart of a signal transmission method according to the present invention.

FIG. 4 shows a flowchart of a signal transmission method used in a distributed base station and a communication system according to the present invention. The flow as shown in FIG. 4 starts in step 401. In step 402, MIMO coding is performed on data of each of the mobile stations, and data of each of the mobile stations is divided into M path data symbols, which M is the number of beams received by the mobile station during signal reception. Next, the flow proceeds to step 403 in which the M path data symbols of each of the mobile stations are multiplied by a weighted coefficient vector corresponding to this path data symbol to obtain beam-forming data of each path data symbol of each of the mobile stations. The weighted coefficient vector denotes weighted coefficient vectors for a data symbol of the mobile station weighted on all the antennas of the antenna-RF processing unit by which the data symbol is to be transmitted. Then, the flow as shown in FIG. 4 proceeds to step 404. In step 404, with respect to each of the antennas of the antenna-RF processing unit, beam-forming data of the respective mobile stations for the antenna is overlapped, and beams pointing to the respective mobile stations are formed by overlapped beam-forming data on the all the antennas of the antenna-RF processing unit, so as to send to the respective mobile stations the multi-path data symbols corresponding to them. The flow as shown in FIG. 4 ends in step 405.

With the distributed base station, communication system and their signal transmission method of the present invention, the following advantages can be achieved:

1. Due to joint processing on MIMO and SDMA, the system capacity will be improved on a large scale;

2. The complex algorithm in the technical solution as provided by the present invention is handled on the base station side, and no complexity is added to the mobile stations. Therefore, it is of great help to reduce costs of the mobile stations;

3. Multiple access interference between the mobile stations can be effectively suppressed with beam forming, and no interference between cells will be produced due to the adoption of the distributed structure. Therefore, it facilitates co-frequency networking and is then well adaptive to MIMO-OFDM systems;

4. Since MIMO transmission is formed by beams from different base stations, spatial wireless channels are relatively independent of each other, and MIMO transmission is suited, and then the problem that traditional MIMO is sensitive to spatial correlation is resolved. Moreover, SDMA is better suitable for environment with line of sight. Therefore, the technical solution according to the present invention is better suitable for urban environment with line of sight and small coverage.

It is to be understood to those skilled in the art that the foregoing embodiment have been presented for purposes of illustration and description. The distributed base station and communication system of the present invention may use more antenna-RF processing units according to the system configuration, and may serve more mobile stations at the same time through setting the number of antennas of these antenna-RF processing units. Additionally, the number of beams received by each mobile station may also be adjusted with the change in the system configuration.

Various modifications and alterations can be made without departing from the spirit and scope of the present invention, and the scope thereof is defined by the appended claims.

What is claimed is:

1. A distributed base station serving mobile stations, comprising:
   a plurality of spatially diverse antenna-RF processing units remote from one another, each of the antenna-RF processing units having an antenna array formed by multiple antennas; and
   a central processing unit remotely connected with said multiple antenna-RF processing units, each of the antenna RF processing units having an antenna array formed by multiple antennas, said central processing unit comprising:
   a MIMO coding unit for MIMO coding of data of each of the mobile stations so that data of each of the mobile stations generates multi-path data symbols;
   a baseband beam-forming unit for multiplying each path data symbol of the multipath data symbols of each of the mobile stations by a weighted coefficient vector corresponding to this path data symbol, to obtain beam-forming data of each path data symbol of each of the mobile stations; and
   an overlapping unit for, with respect to each antenna in said antenna RF processing units, overlapping beam-forming data of the respective mobile stations for this antenna and feeding the overlapped beam-forming data to this antenna for transmission, wherein the overlapping unit of the baseband beam-forming unit multiplies each path data symbol of each given mobile station by only two weighted coefficient vectors corresponding to two selected antenna-RF processing units selected by the given mobile station to obtain beam-forming data of each path data symbol of each of the mobile stations.

2. The distributed base station according to claim 1, wherein the number of the multi-path data symbols generated by said MIMO coding unit is the same as the number of beams received by each of the mobile stations during signal reception.

3. The distributed base station according to claim 1, wherein beam-forming data of each path data symbol of said mobile station forms beams, which point to said mobile stations, on all antennas of the corresponding antenna RF processing unit.

4. The distributed base station according to claim 1, wherein a weighted coefficient vector of each of the mobile stations on each antenna of each of the antenna-RF processing unit is calculated using channel measurement and feedback information of the mobile stations and based on a criterion for reducing interference on other mobile stations.

5. The distributed base station according to claim 1, wherein said MIMO coding unit performs coding using Space Time Block Code or, Space Frequency Block Code or Spatial Reuse.

6. A communication system comprising:
   a distributed base station according to claim 1 and multiple mobile stations, wherein beams which said distributed base station directionally transmits to each of the mobile stations via its antennas constitute an MIMO transmission system together with antennas of the corresponding mobile station.

7. A method of signal transmission between a distributed base station and mobile stations, wherein said distributed base station comprises multiple antenna-RF processing units remote from one another and a central processing unit remotely connected with said multiple antenna-RF processing units, the method comprising the following steps:
   an MIMO coding step for MIMO coding of data of said base station for each of the mobile stations to divide data of each of the mobile stations into multi-path data symbols;
   a baseband beam-forming data obtaining step for multiplying each path data symbol of the multipath data symbols of each of the mobile stations by a weighted coefficient vector corresponding to this path data symbol to obtain beam-forming data of each path data symbol of each of the mobile stations, wherein the baseband beam-forming data obtaining step includes multiplying each path data symbol of each given mobile station by only two weighted coefficient vectors corresponding to two selected antenna-RF processing units selected by the given mobile station to obtain beam-forming data of each path data symbol of each of the mobile stations; and
   an overlapping step for, with respect to each antenna in a plurality of spatially diverse remote antenna-RF processing units, overlapping beam-forming data of the respective mobile stations for this antenna and feeding the overlapped beam-forming data to this antenna for transmission.

8. The method of signal transmission according to claim 7, wherein the number of the multi-path data symbols generated in said MIMO coding step is the same as the number of beams received by each of the mobile stations during signal reception.

9. The method of signal transmission according to claim 7, wherein beam-forming data of each path data symbol of said mobile station forms beams, which point to said mobile stations, on all antennas of the corresponding antenna-RF processing unit.

10. The method of signal transmission according to claim 7, wherein a weighted coefficient vector of each of the mobile stations on each antenna of each of the antenna-RF processing unit is calculated using channel measurement and feedback information of the mobile stations and based on a criterion for reducing interference on other mobile stations.

11. The method of signal transmission according to claim 7, wherein said MIMO coding step performs coding using Space Time Block Code or, Space Frequency Block Code.

12. The distributed base station of claim 1, wherein the central processing unit processes baseband signals.

13. The communication system of claim 6, wherein the central processing unit of the distributed base station processes baseband signals.

14. The method of claim 7, wherein the MIMO coding step, beam-forming data obtaining step and overlapping step are performed on baseband signals.

15. The distributed base station of claim 1, wherein beam-forming data of each path data symbol for each mobile station forms beams, which point to said mobile station, on antennas of only the antenna-RF processing units corresponding to said mobile station.

16. The method of claim 7, wherein beam-forming data of each path data symbol of said mobile station forms beams, which point to said mobile station, on antennas of only the corresponding antenna-RF processing unit.

17. The distributed base station of claim 1, wherein the plurality of spatially diverse antenna-RF processing units are widely spaced from each other such that spatial correlation between two antennas selected by a given one of the mobile stations is very weak.

18. The communication system of claim 6, wherein the plurality of spatially diverse antenna-RF processing units are widely spaced from each other such that spatial correlation between two antennas selected by a given one of the mobile stations is very weak.

* * * * *